(12) United States Patent
Merz (10) Patent No.: US 12,427,801 B1
(45) Date of Patent: Sep. 30, 2025

(54) SYSTEMS AND METHODS FOR INTEGRATING DIGITAL OPERATIONS WITH A PHYSICAL GREETING CARD

(71) Applicant: MASTERCARD INTERNATIONAL INCORPORATED, Purchase, NY (US)

(72) Inventor: Christopher John Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/767,824

(22) Filed: Jul. 9, 2024

(51) Int. Cl.
G06Q 20/32 (2012.01)
B42D 15/08 (2006.01)
G06K 19/06 (2006.01)

(52) U.S. Cl.
CPC ..... *B42D 15/085* (2013.01); *G06K 19/06037* (2013.01); *G06Q 20/3274* (2013.01)

(58) Field of Classification Search
CPC .......... B42D 15/085; G06K 19/06037; G06K 19/00; G06K 7/1417; G06Q 20/3274
USPC ................. 235/494, 487, 462.09, 462.1, 375
See application file for complete search history.

(56) References Cited

U.S. PATENT DOCUMENTS

| | | |
|---|---|---|
| 8,285,587 B2 | 10/2012 | Saguy |
| 8,589,314 B2 | 11/2013 | Friedman |
| 9,760,936 B1 | 9/2017 | Shaw et al. |
| 10,915,937 B1 | 2/2021 | Hecht |
| 11,354,646 B2 | 6/2022 | Kohli et al. |
| 11,379,823 B2 | 7/2022 | Isaacson et al. |
| 2007/0208627 A1 | 9/2007 | Abadi |
| 2009/0327129 A1 | 12/2009 | Collas et al. |
| 2011/0276473 A1 | 11/2011 | Blok |
| 2012/0130794 A1* | 5/2012 | Strieder ............ G06Q 30/0226 705/14.27 |
| 2012/0226614 A1 | 9/2012 | Gura et al. |
| 2014/0081769 A1* | 3/2014 | Wilen ................. G06Q 20/354 705/14.66 |
| 2014/0089117 A1 | 3/2014 | Schumacher |
| 2014/0207612 A1* | 7/2014 | Isaacson ................ G06Q 40/02 705/26.8 |

(Continued)

FOREIGN PATENT DOCUMENTS

| | | | | |
|---|---|---|---|---|
| WO | WO-2019090236 A1 * | 5/2019 | ....... | G06K 19/07786 |
| WO | WO-2023129556 A1 * | 7/2023 | ......... | H04N 21/2542 |

OTHER PUBLICATIONS

Presently, https://getpresently.com/about/how-it-works/, 5 pages.

*Primary Examiner* — Edwyn Labaze
(74) *Attorney, Agent, or Firm* — Armstrong Teasdale LLP (57) ABSTRACT

A system including a greeting card, a scannable code positioned on a surface of the greeting card, and a computer device comprising at least one memory and at least one processor in communication with the memory. The at least one memory storing instructions causing the at least one processor to electronically create a profile data file associated with the participant and a beneficiary designated by the participant. The profile data file configured to receive and store message data and configuration data, the configuration data including at least an account identifier for linking transferred funds to the profile data file.

20 Claims, 7 Drawing Sheets

(56) References Cited

U.S. PATENT DOCUMENTS

| | | |
|---|---|---|
| 2014/0263675 A1* | 9/2014 | Beadles .................. G09F 1/06 |
| | | 235/494 |
| 2020/0005293 A1 | 1/2020 | Opeola |
| 2021/0233134 A1* | 7/2021 | Marin .................. G06Q 20/346 |
| 2024/0005386 A1* | 1/2024 | Thurairatnam ........ G06Q 20/02 |

* cited by examiner

FIG. 7

SYSTEMS AND METHODS FOR INTEGRATING DIGITAL OPERATIONS WITH A PHYSICAL GREETING CARD

BACKGROUND

The field of the disclosure relates generally to greeting cards and, more particularly, to systems and methods for integrating physical greeting cards with digital operations using a code for accessing the digital operations that are combinable with the physical greeting card.

In this digital age, communications are typically performed using electronic messages, emails, text messages, and/or other digital means of communication. However, consumers may still desire and enjoy the nostalgia and sentimental value of receiving and/or sending a physical greeting card. For example, recipients may keep or display greeting cards, reminding the recipient of the life event and generosity of their friends and family. Unfortunately, these more traditional and historical means of communication do not provide users the convenience of digital communications nor do they facilitate collaboration between multiple parties.

During some life events, friends and family may be tasked with collecting messages, cash, gift cards, etc., from multiple other friends, family, coworkers, etc., on behalf of a beneficiary, which is a tedious and time-consuming endeavor. However, even with these drawbacks, the nostalgia of receiving greeting cards which are tactile and capable of creating an emotional connection between the recipient of the gift card and benefactors, is still desired.

As more and more consumers are interested in maintaining traditional and/or sentimental means of communication, it is desirable to offer physical greeting cards that also provide the benefits and convenience of digital communication.

BRIEF DESCRIPTION

In one aspect, a digital operation (DO) system is provided. The system includes a greeting card, a scannable code positioned on a surface of the greeting card, and a computer device comprising at least one memory and at least one processor in communication with the memory. The at least one memory storing instructions executable to cause the at least one processor to in response to a participant scanning the code on the greeting card, electronically create a profile data file stored within the at least one memory, the profile data file associated with the participant and a beneficiary designated by the participant, the profile data file configured to receive and store message data and configuration data, the configuration data including at least an account identifier for linking transferred funds to the profile data file. The instructions cause the at least one processor to electronically transmit a participating message to a benefactor computer device identified by the participant, the participating message prompting the benefactor to submit a participant data file including a benefactor account identifier and a contribution amount and receive a first participant submitted data file from the benefactor computer device including the benefactor account identifier and the contribution amount for storing within the profile data file. The instructions cause the at least one processor to transfer funds equal to the contribution amount from the benefactor financial account into a trust account associated with the profile data file and receive a second message from a requesting computer device initiated by scanning of the scannable code, the second message requesting access to the profile data file. The instructions cause the at least one processor to authenticate the requesting computer device as being associated with the designated beneficiary and transfer the profile data file to the authenticated beneficiary computer device and funds in the contribution amount from the trust account into the beneficiary financial account.

In another aspect, a computer-implemented method of digital operation for use with a greeting card including a scannable code positioned on a surface of the greeting card and a computer system having a memory and at least one processor in communication with the memory is provided. The method includes in response to a participant scanning the code on the greeting card, electronically creating a profile data file stored within the at least one memory, the profile data file associated with the participant and a beneficiary designated by the participant, the profile data file configured to receive and store message data and configuration data, the configuration data including at least an account identifier for linking transferred funds to the profile data file and electronically transmitting a participating message to a benefactor computer device identified by the participant, the participating message prompting the benefactor to submit a participant data file including a benefactor account identifier and a contribution amount. The method includes receiving a first participant submitted data file from the benefactor computer device including the benefactor account identifier and the contribution amount for storing within the profile data file and transferring funds equal to the contribution amount from the benefactor financial account into a trust account associated with the profile data file. The method includes receiving a second message from a requesting computer device initiated by scanning of the scannable code, the second message requesting access to the profile data file and authenticating the requesting computer device as being associated with the designated beneficiary. The method includes transferring the profile data file to the authenticated beneficiary computer device and funds in the contribution amount from the trust account into the beneficiary financial account.

In yet another aspect, at least one non-transitory computer-readable storage medium that includes computer-executable instructions embodied thereon that when the computer-executable instructions are executed by at least one processor of a digital operation computer is provided. The computer-executable instructions cause the at least one processor to in response to a participant scanning a code on a greeting card, electronically create a profile data file stored within a memory, the profile data file associated with the participant and a beneficiary designated by the participant, the profile data file configured to receive and store message data and configuration data, the configuration data including at least an account identifier for linking transferred funds to the profile data file and electronically transmit a participating message to a benefactor computer device identified by the participant, the participating message prompting the benefactor to submit a participant data file including a benefactor account identifier and a contribution amount. The computer-executable instructions cause the at least one processor to receive a first participant submitted data file from the benefactor computer device including the benefactor account identifier and the contribution amount for storing within the profile data file and transfer funds equal to the contribution amount from the benefactor financial account into a trust account associated with the profile data file. The computer-executable instructions cause the at least one processor to receive a second message from a requesting computer device initiated by scanning of the scannable code, the second message requesting access to the profile data file and authenticate the requesting computer device as being associated with the designated beneficiary. The computer-executable instructions cause the at least one processor to transfer the profile data file to the authenticated beneficiary computer device and funds in the contribution amount from the trust account into the beneficiary financial account.

DETAILED DESCRIPTION OF THE DISCLOSURE

The following detailed description illustrates embodiments of the disclosure by way of example and not by way of limitation. It is contemplated that the systems and processes described herein are generally configured to enable a user to easily input and store custom digital messages including attaching data files (e.g., images and/or video files) for a beneficiary and generate and access a trust account using a quick response (QR) code. More specifically, the embodiments of the systems and methods described herein relate generally to systems and methods configured to enable multi-party access to a digital operation (DO) profile in tandem with a physical greeting card that includes the QR code, and thus, providing the advantages of digital communications and collaboration, while maintaining the nostalgia and sentimental value of a physical greeting card.

The multiparty system may include at least one benefactor and at least one beneficiary. The benefactors may include an organizer, who initiates and registers the DO profile on behalf of a beneficiary. The benefactors may also include one or more participants who may also access and/or contribute to the DO profile. The organizer may register a DO profile by providing profile details, such as benefactor data, beneficiary data, dates, and times for events, greeting statements, and/or any suitable data necessary to register the DO profile. The DO profile may be supported by a web-based site and/or GUI that is supported and/or displayed on one or more computer devices using an application program interface. In some embodiments, the organizer may provide a list of benefactors/participants who may access the DO profile by providing names, email addresses, phone numbers, other identifiers, and additional and/or alternative contact information for the participants. The DO computer device may transmit one or more participating and/or notification messages to the participants, prompting participants to access the DO profile and/or contribute to the DO profile. As used herein, contributing to the DO profile may include a participant accessing and viewing the DO profile, uploading and/or submitting a message or media file, and/or a participant submitting financial account information/identifier and financially contributing a donation for the beneficiary.

In some embodiments, the organizer may acquire (e.g., purchase or receive) a DO greeting card. The DO greeting card may be embodied as an insert style card (e.g., not folded) or a folded card-style card. The DO greeting card may include one or more pages and/or one or more printed and/or embossed messages or images (e.g., Happy Birthday, Congratulations, or other celebratory or condolence messages and/or event details) suitable for the occasion (e.g., birthdays, engagements/weddings, social events, etc.) for purchasing and/or sending the DO greeting card to the beneficiary. The DO greeting card may be suitable for any occasion in which funds are collected and/or messages are transmitted. For example, and without limitation, the DO greeting card may be utilized for school trips/events, enabling parents and students to make a financial contribution and/or enabling chaperones and/or students to upload messages and/or images of an event. Further, the DO greeting card may be utilized to return submitted funds should the event or occasion be cancelled.

In the exemplary embodiments described herein, the DO greeting card also includes one or more quick response (QR) codes (barcode or any other suitable code) printed or embossed on the surface of a page of the DO greeting card. The QR code may be scanned by a camera of a participant computer device (e.g., a cellular phone) electronically directing the participant computer device to the DO profile supported by the DO system. During registration, the organizer may scan the QR code and the DO system may prompt the organizer to register a DO profile to be associated with the QR code. The DO greeting card may include a single QR code capable of both directing the organizer to register the QR code to a DO profile and then subsequently, scanning of the same QR code will direct participants to view and/or contribute to the previously registered DO profile.

In embodiments described herein, the DO system establishes a safe and secure, (e.g., encrypted) communication link between participant's financial institutions and a DO financial institution enabling participants to electronically donate (transmit) funds which will be collected and held in a trust account at the DO financial institution until a beneficiary accepts or retrieves the donated funds. For example, participants may access the DO profile to provide financial account identifier and a desired donation amount enabling a transfer of funds from the financial account of the benefactor to be transferred to the trust account. In addition, the beneficiary may also provide financial account identifier enabling funds in the trust account to be transferred to the beneficiary financial account. Additional control operations described herein may also be applied by the system to the upload of funds and the transfer of funds to ensure a secure transfer of funds and data between the computer devices. These control operations may include fraud detection controls, biometric authentication, encryption, timing controls, and other security measures for ensuring a safe transfer of data and funds between the parties.

In embodiments described herein, participants may utilize the DO profile to add one or more benefactor modules. The benefactor modules may include a view that is supported by the DO profile. The DO profile may contain one or more benefactor modules allowing multiple benefactors to upload images, videos, text messages, or any other suitable media file to the DO profile, while hiding the benefactor module from the other benefactors who may also access the DO profile, providing privacy to the user of the DO system. In some other embodiments, the DO profile may display all the benefactor modules in a single view of the DO profile. In some embodiments, the DO profile includes one or more benefactor modules that are accessible by the organizer but are hidden to the other participants. In some embodiments, the organizer may select a hidden mode, wherein benefactor modules are hidden or a transparent mode where each benefactor modules is visible to all the participants. The DO profile is modular and customizable, enabling participants, e.g., the organizer, to tailor the DO profile to the specific event and participants.

In the embodiments described herein, the DO system includes one or more security features, protecting confidential or sensitive information and data provided by participants. For example, financial data provided by participants may be encrypted. In some embodiments described herein, the DO system and the DO profile may be accessible through use of login credentials, such as a pin, a password, and/or code, limiting or restricting access to only participants in possession of the login credentials. In some embodiments, during registration, the DO system may transmit messages to participants, using participant information, e.g., cellphone or email addresses provided by the organizer, the messages including the login credentials enabling the participants to access the DO profile. In some embodiments, the DO system may provide the beneficiary a separate or different login credential, such that only the beneficiary is enabled to access and/or accept donation/contribution funds. Additionally, the login credentials prevent unwanted users from accessing the DO profile/funds, in the event that the physical greeting card is lost or stolen. In some embodiments, the DO system and/or the DO profile may utilize metadata, cellphone data, email addresses, etc., in order to verify and allow access, e.g., submission of financial account information or identifier, to the DO profile for approved participants only, such as participants identified during enrollment or by the organizer.

In addition, the DO system and/or the DO profile includes additional features for securing the confidentiality and security of the participants, for example, financial data, or information, such as, messages, images, and video, submitted by participants may be automatically deleted after an expiration time and/or after a beneficiary has accepted funds or opened messages. Additionally, the DO profile may be deleted automatically after an expiration time.

At least one of the technical problems addressed by the systems and methods include: i) difficulty and/or an inability to collaborate with multiple participants when sending a greeting card to a participant, ii) difficulty and/or an inability to collect donation or contribution funds from multiple participants, iii) inconvenience and/or inability to collect and combine donation funds having various forms, e.g., cash, check or money order, and/or digital funds, into a single form for delivery to a benefactor, iv) inability to combine the convenience of digital communication with a desired sentimental value associated with traditional means of communications, e.g., a physical greeting card, v) limited safety, security, or privacy when accumulating funds and/or sentiments from a plurality of benefactors on behalf of a beneficiary, and vi) inefficiency in computer processing of disparate and sensitive data files from multiple different participant computer devices.

The resulting technical effect achieved by the systems and methods described herein is at least one of: i) enabling collaboration with multiple participants when sending a greeting card to a participant, ii) enabling quick and efficient collection of donation funds from multiple participants; iii) enabling quick and efficient collection and combination of donation funds having various forms, e.g., cash, check or money order, and/or digital funds, into a single form for delivery to a benefactor; iv) enabling collaborative interactions with a trust account between participants, v) combining the convenience of digital communication with desired sentimental value associated with a traditional means of communications, e.g., a physical greeting card and vi) improved safety, security, or privacy when accumulating funds and/or sentiments from a plurality of benefactors on behalf of a beneficiary.

In embodiments described herein, the systems and methods, which are implemented using computer devices, improve the computational efficiency, e.g., reduced computation loads and compiling times, as different, and/or disparate data files received from the multiple different participants may be transformed by the computer device, utilizing a translation module, into a single, common, or standard format type, e.g., through scaling, resampling, and/or alternative and/or additional reformatting operations, such that the DO profile may display the formatted data files in an organized and intuitive manner.

Furthermore, the systems and methods described herein reduce memory size, conserves computational resources, and provide security to sensitive data files received from participants by encrypting data files, verifying approved participants, and/or restricting access to the profile, and/or deleting caches of data or deleting the DO profile upon expiration.

The methods and systems described herein may be implemented using computer programming or engineering techniques including computer software, firmware, hardware or any combination or subset thereof, wherein the technical effect may be achieved by performing at least one of the following steps: i) in response to a participant scanning the code on the greeting card, electronically transmit a participating message to a benefactor computer device, the participating message prompting the benefactor to submit benefactor information associated with a benefactor account and an amount ii) receive a first message from a benefactor computer device including benefactor account information associated with a benefactor financial account and an amount iii) transfer funds in the amount from the benefactor financial account into a trust account iv) receive a second message from a beneficiary computer device including beneficiary financial account associated with a beneficiary financial account v) and transfer funds in the amount from the trust account into the beneficiary financial account.

As used herein, an acquiring bank or acquirer is typically a bank (or financial institution) at which a merchant holds an account. Further, an issuing bank or issuer (or financial institution) is typically a bank at which a customer or cardholder holds an account. The account may be debited or charged through the use of a debit card, a credit card, or another type of payment card as described herein.

As used herein, the terms "payment card," "financial transaction card," and "transaction card" refer to any suitable payment card, such as a credit card, a debit card, a prepaid card, a charge card, a membership card, a promotional card, a frequent flyer card, an identification card, a gift card, and/or any other device that may hold payment account data, such as mobile phones, smartphones, smart cards, digital wallets, personal digital assistants (PDAs), key fobs, and/or computers. Each type of payment card can be used as a method of payment for performing a transaction. In addition, cardholder account behavior can include but is not limited to purchases, management activities (e.g., balance checking), bill payments, achievement of targets (meeting account balance goals, paying bills on time), and/or product registrations (e.g., mobile application downloads).

Figure 1:
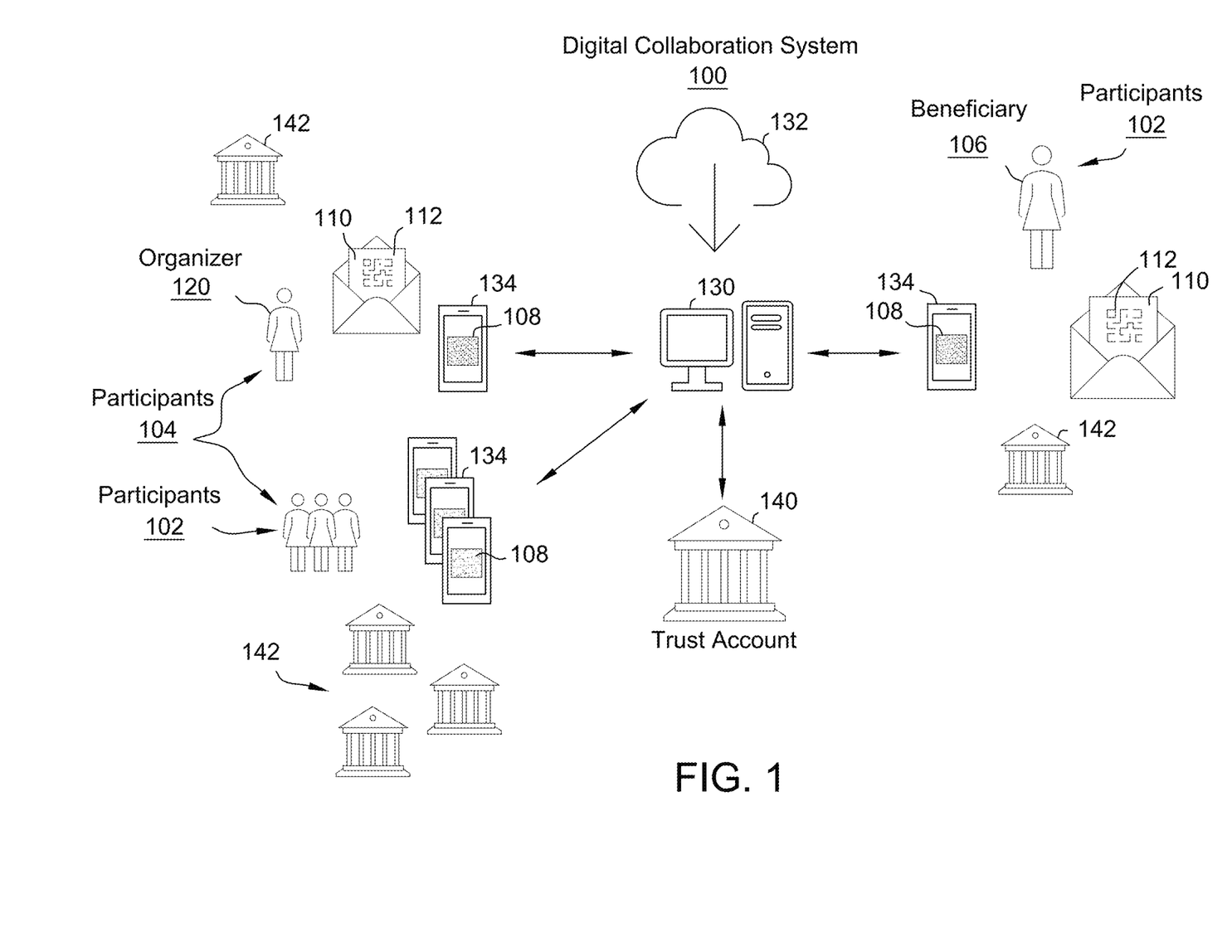
FIG. 1 is a schematic diagram illustrating an example digital operation system enabling multi-parties to provide messages along with other digital files and deposit funds to a trust account accessible for withdrawal by a beneficiary.

FIG. 1 is a schematic diagram illustrating an example multi-party digital operation (DO) system 100 enabling multiple participants 102 (e.g., benefactors 104 or beneficiaries 106) access to a digital operation (DO) profile 108. The DO system 100 includes a physical DO greeting card 110, having a quick response (QR) code 112 embossed or printed on the DO greeting card 110. A DO profile 108 may be generated on behalf of one or more beneficiaries 106 by one or more benefactors 104. The DO profile 108 may be considered an electronic data file, as referred to herein as a profile data file. Benefactors 104 may refer to any party who contributes or interacts with the DO profile 108, regardless of whether the benefactor 104 contributes financially to the DO profile 108. Benefactors 104 may include an organizer 120, who initiates generation of the DO profile 108 (e.g., the person(s) who purchases the DO greeting card 110 and/or the first person to first scan the QR code 112 on the DO greeting card 110), or the one who registers the DO profile 108 by providing registration data. The DO profile 108 is associated with the participants 102, e.g., at least one beneficiary 106 identified or designated by the organizer 120, and one or more benefactors 104.

The DO system 100 includes a DO computer system 130, and associated processor communicatively coupled to a database 132 or memory storage device, e.g., a cloud-based database, for storing the DO profiles 108. The DO computer system 130 may be communicatively coupled to a plurality of participant computer devices 134 enabling the participants 102 to access DO profiles 108 supported by the DO computer system 130. The DO computer system 130 may store the DO profile 108 as an electronic data file within the memory of the DO computer system 130.

The DO system 100 includes a DO financial institution 140 communicatively coupled to the DO computer system 130. The DO financial institution 140 may support trust accounts associated with DO profiles 108. The participants 102 may have a financial account supported by a participant financial institution 142. Participant's may provide financial account credentials, to the DO profile 108, and the DO system 100 establishes a financial link between the DO financial institution 140 and the participant financial institution 142. Financial account credentials may include any suitable financial information enabling the DO system 100 to establish a financial link between the trust account and an account of a participant.

The DO profile 108 enables benefactors 104 to provide financial information and a designated amount enabling the benefactors 104 to donate money to the beneficiary 106. The DO computer system 130 directs funds submitted by benefactors 104 to the established trust account associated with the DO profile 108 using the established financial transactional link between participants financial institution and the DO financial institution 140. The beneficiary 106 may also provide beneficiary 106 financial account information and the DO profile 108 is enabled to transfer funds from the trust account to the beneficiary 106 financial account. In some embodiments, the DO profile 108 is enabled to issue funds to a beneficiary 106 using alternative means. For example, in some embodiments, the beneficiary 106 may submit a mailing address, and the DO system 100 may distribute funds to the benefactor 104 by mailing a check, or money order, or gift card, and the like. In some embodiments, the beneficiary 106 may submit an email address and the DO system 100 may distribute funds digitally, e.g., electronic gift cards, etc.

Participant computer device, associated with the organizer 120, upon scanning the QR code 112, may be directed to a web-based platform or a graphical user interface enabled via an application program interface executed on the participant computer device, displaying a registration view for generating the DO profile 108. The registration view enables the organizer 120 to enter user data, such as beneficiary 106 data, benefactor 104 data, event data, a message to be displayed to the beneficiary 106, e.g., "congratulations," "happy birthday," etc. Registration may also allow the organizer 120 to generate a message that may be displayed to the other benefactors 104, e.g., "Beneficiary is retiring next week, lets show our appreciation by providing a donation, I suggest a contribution between $10 and $20." In some embodiments, the DO system 100 is enabled to hide benefactor 104 messages from the beneficiary 106, if desired or selected by the organizer 120. For example, benefactor 104 messages may include details that the organizer 120 may wish to have hidden from the beneficiary 106, for example, details regarding a surprise party, or details reminding the participants 102 of the benefactor's financial need, etc. Further, the DO system 100 may enable the organizer 120 to customize the DO profile 108 during registration, or during a subsequent time after registration.

In some embodiments, the DO profile 108 registration view includes one or more suggested messages that are auto-populated while enabling users to modify the auto-populated message or compose a new message entirely, as desired by the participants 102. In some embodiments, the registration view of the DO profile 108 prompts the organizer 120 to provide necessary data, e.g., drop-down menus, dialogue boxes, and the like, including prompts requesting information from the organizer 120. The DO profile 108 registration view also prompts the organizer 120 to submit other benefactor 104 information, e.g., email addresses, telephone numbers, etc. Upon registering the DO profile 108, the DO computer device transmits messages to the other benefactors 104. The messages may be transmitted digitally, e.g., using email or text messages, and include a hyperlink or a QR code, enabling the participants 102 to access the DO profile 108, e.g., by scanning the QR code or selecting the hyperlink using a participant computer device associated with the participant. In some embodiments, only the organizer 120 and the eventually the beneficiary 106, have may access to the physical greeting card 110 and other participants 102 only interact with the DO profile 108 digitally.

In some embodiments, the organizer 120 may enable other participant to act an organizer 120, e.g., such that other participants 102 may have access to altering text within the DO profile 108 or entering additional or alternative contact information for benefactors 104/beneficiaries 106. In some embodiments, the organizer 120 is the only party enabled to alter the settings of the DO profile 108 and/or add participant contact information. In some embodiments, the DO profile 108 may enable organizers 120 to filter, sort, or review contributions from participants 102. For example, in some embodiments, the DO system 100 enables the organizer 120 to edit, alter, or delete, messages or contributions submitted by the other participants 102.

In some embodiments, the DO computer system 130 may issue one or more reminder messages, or other notifications, to the participant computer devices 134, e.g., reminding a benefactor 104 to participate in the DO profile 108 and/or reminding a beneficiary 106 to accept funds or respond to the DO profile 108.

In some embodiments, the DO computer system 130 includes a translation module that accepts data files from participants 102, which may be in disparate data types, data languages, and/or formats, and the translation module may reformat, translate, reshape/scale, resample, and/or transform the disparate data files into a single or uniform data type, such that the DO profile 108 may display or present the reformatted data files.

Figure 2:
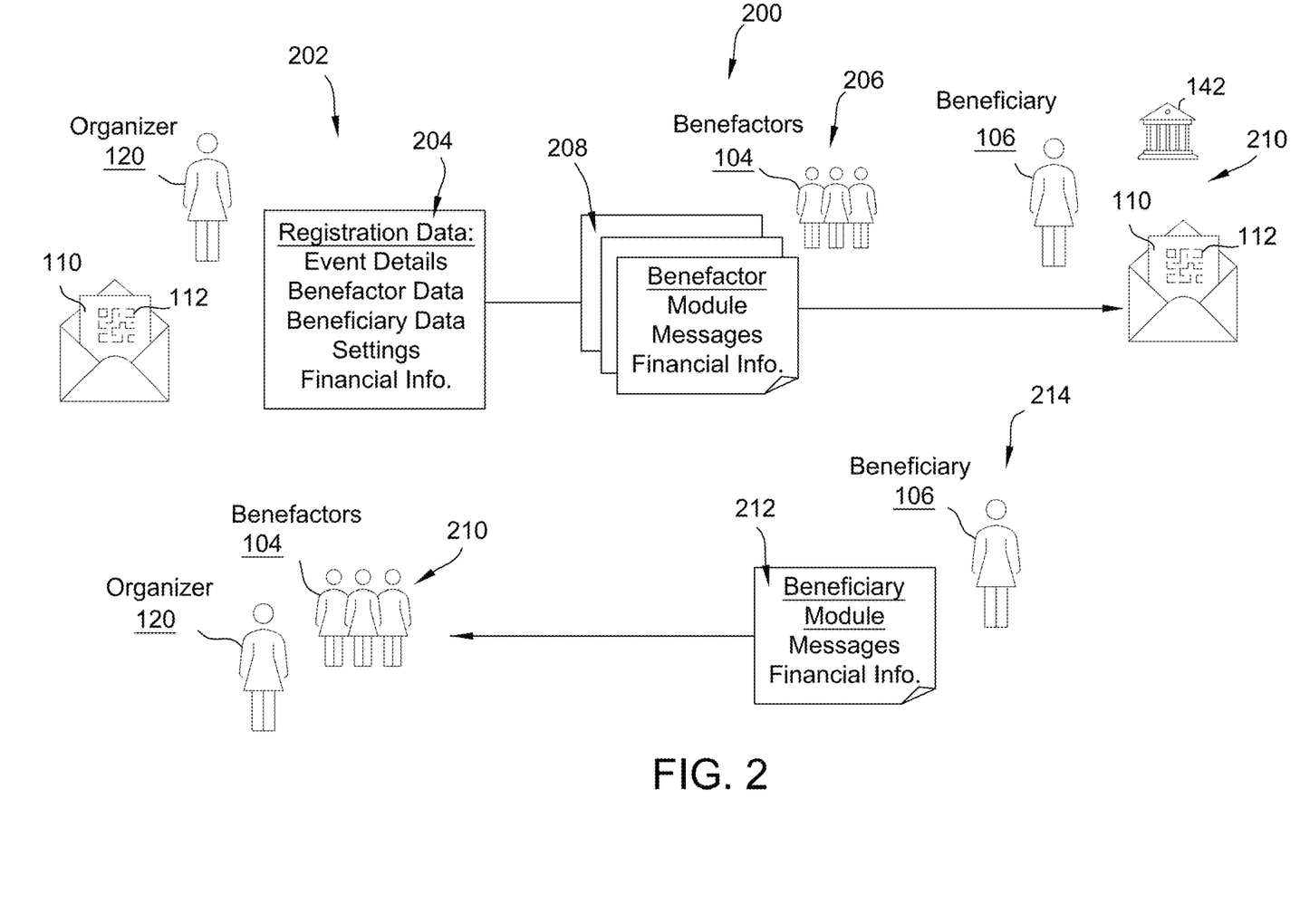
FIG. 2 is a schematic flow chart of an example process for use with the digital operation system shown in FIG. 1.

FIG. 2 is a flow chart of an exemplary method 200 for use with the DO system 100, shown in FIG. 1. The exemplary method 200 is initiated 202 when the organizer 120 registers a DO profile 108, e.g., by providing registration data 204 to the registration view supported by the DO profile 108. Registering a DO profile 108 may include the organizer 120 purchasing or acquiring the DO physical greeting card 110. Registering the DO profile 108 also includes the organizer 120 scanning the QR code 112, on the physical DO greeting card 110, using a camera supported by a participant computer device 134, e.g., a cellular phone, associated with the organizer 120. Upon scanning of the QR code 112, the participant computer device 134 is automatically transferred to a DO profile 108 supported by an internet-based website. Additionally, and/or alternatively, scanning the QR code 112 automatically causes the participant computer device 134 to display the DO profile 108 using a graphical user interface supported by the application program interface executed on the participant computer device 134. The DO profile 108, supported by the graphical user interface and/or the DO website, may display a registration view, prompting the organizer 120 to input data associated with registering the DO profile 108, including entering contact information of other participants 102.

The DO profile 108 and/or the DO computer device 130 may receive any suitable data files from participants, 102. These participant submitted data files submitted by participants 102 may include message data (e.g., messages, notes, videos, images, gifs, etc.) as well as configuration data (e.g., financial information, contribution amounts, validation/verification data, etc.). The validation or verification information may be included in the metadata of the submitted data files, and may include phone numbers, email addresses, login credentials, PINs, codes, biometrics, and the like. The DO computer device 130 may encrypt a portion or all of the data contained within a participant submitted data file. In some embodiments, the DO computer device 130 may encrypt configuration data, such as financial account information. The DO profile 108 may store the message data and the configuration data in different format types, and in some embodiments, the DO profile 108 hides and/or restricts access to configuration data from one or more participants 102. In some embodiments, the DO computer device 130 may activate, e.g., make available, the DO profile 108 for access by the designated beneficiary 106 and/or other participants 102.

When the organizer 120 initiates registration of the DO profile 108, the DO computer system 130 generates a trust account associated with the DO profile 108 at the DO financial institution 140. In some embodiments, the DO computer system 130 may link the trust account to a DO profile 108, when at least one benefactor 104 submits financial information and/or donates funds to the DO profile 108. In some embodiments, the DO computer system 130 may generate a trust account, regardless of whether the organizer 120 or other participants 102 submit financial information or donate funds. Responsive to the organizer 120 and/or any other beneficiary 106 submitting financial information and a donation amount, the DO computer system 130 establishes a financial link between the participant financial institutions 142 and the DO financial institution 140 such that funds may be transferred between the financial institutions. Establishing the financial link may include providing the DO financial institution 140 with financial account information, such as, and without limitation, routing number or account number, associated with the account at the participant financial institution 142.

The method 200 further includes benefactor interaction 206 with the DO profile 108. For example, after the organizer 120 finalizes registration of the DO profile 108, one or more participation messages are automatically, and electronically, transmitted to the other participants 102 for which contact information was provided by the organizer 120.

Upon receiving the participation message, at participants computer devices 134, the participants 102 may be prompted to access and/or contribute to the DO profile 108. The participation message may be in the form of an email, a text message, and the like, containing a hyperlink or QR code. The QR code contained in the participation message may or may not be the same as QR code 112. Upon selection of the hyperlink, or scanning of the QR code, the participant computer device 134 will be directed to the DO website and/or the graphical user interface, enabling the participants 102 to access the DO profile 108, in order to contribute to the DO profile 108, and/or a benefactor module 208 by submitting a message or donating funds, as described above with respect to FIG. 1. Benefactor interaction 206 may include the benefactors 104 submitting financial account information and/or a donation amount using the DO profile 108.

In some embodiments, after the benefactors 104 have contributed to the DO profile 108, and/or after an expiration period of time, as selected by the organizer 120, the organizer 120 may give, or mail, the physical DO greeting card 110 to the beneficiary 106. After the beneficiary 106 receives the physical DO greeting card 110, the beneficiary 106 may scan the QR code 112, using a camera supported by the beneficiary computer device 134, automatically causing the beneficiary 106 computer device to display the DO website and/or the graphical user interface, enabling the beneficiary 106 to access the DO profile 108 and one or more benefactor modules 208. After the beneficiary computer device 134 scans the QR code 112, method 200 further includes the beneficiary 106 accepting 210 funds using the DO profile 108. Accepting 210 funds using the DO profile 108, may include the beneficiary 106 entering financial information associated with a financial account of the beneficiary 106 and the DO computer system 130 establishes a financial link between the beneficiary financial institution 142 and the DO financial institution 140 enabling transfer of funds contained within the trust account to be issued to the beneficiary 106 financial account. In some embodiments, the beneficiary 106 may need to also approve or accept funds, and then the funds may be transferred, from the trust account, into the account associated with the beneficiary 106. In some alternative embodiments, the funds may be transferred, from the benefactor 104 financial account, directly, to the beneficiary 106 financial account, without requiring acceptance of funds by the beneficiary 106, e.g., the beneficiary 106 may not need to accept each instance of donated funds by benefactors 104, rather the beneficiary 106 may only need to enter financial information a single instance to accept any funds submitted by benefactors 104.

In some embodiments, if the beneficiary 106 does not enter financial account information, and/or if the beneficiary 106 does not accept funds, the funds may be held in the trust account for a predetermined amount of holding time as set by the DO system 100, or as selected by the organizer 120. Upon expiration of the holding time, the DO system 100 may reimburse the donated funds to the benefactor 104 financial accounts. In some embodiments, the DO system 100 may be in accessible to benefactors 104 after the DO profile 108 has been accessed by the beneficiary 106. In some embodiments, the DO system 100 may prevent benefactors 104 from providing financial information or donating funds, after the beneficiary 106 has accepted funds, e.g., funds already submitted by other benefactors 104. In some embodiments, the DO profile 108 may be inaccessible to all parties after a hold period of time after the beneficiary 106 has accepted funds.

In some embodiments, the DO system 100 enables participants 102 to print or save documents submitted to the DO profile 108. For example, in some embodiments, the DO system 100 may include a print view or a download button, enabling the beneficiary 106 to easily print, download, or save benefactor 104 messages and/or images, e.g., prior to the DO profile being deleted/expired. In some embodiments, the DO system 100 enables participants 102 to download media, e.g., audio or video, submitted to the DO profile 108. In some embodiments, the system 100 enables participants 102 to save the DO profile 108, including media submitted to the DO profile 108, such that the saved DO profile 108 is available for future viewing/editing, e.g., through an application program interface and/or a website. In some embodiments, the saved DO profile 108 may merely include messages and/or media submitted by the participants 102, but financial and/or sensitive information will be removed from the saved profile, e.g., after an expiration time. In some embodiments, the DO profile 108 may have a timeline view, wherein messages and/or media submitted by participants 102 is organized in a timeline manner based on the time that the messages and/or media was submitted by the participant 102. In other embodiments, the DO profile 108 may have any suitable viewing or organization or arrangement of messages and/or media submitted by participants 108.

Method 200 may further include the beneficiary 106 responding 214 to the benefactors 104. For example, the beneficiary 106 may utilize the DO profile 108 or beneficiary module 212 to transmit one or more thank you messages. The beneficiary module 212 may be a view supported by the DO profile 108 that is accessible by the beneficiary 106 and/or one or more benefactors 104. For example, the beneficiary 106 may upload messages, e.g., a thank you message, intended to be viewed by an identified benefactor 104, to the beneficiary module 212 that is only accessible to the identified benefactor 104, e.g., the message may be hidden from other participants 102. In some embodiments, the DO profile 108 may automatically transmit thank you messages or notification messages indicating that the beneficiary 106 has accepted the funds. In some embodiments, the DO profile 108 may display each of the funds, individually, using the benefactor modules 208 to identify the specific benefactor 104 who donated the funds. In some embodiments, the DO profile 108 may show a total amount of donated funds, without identifying the individual amounts donated by individual benefactors 104.

Figure 3:
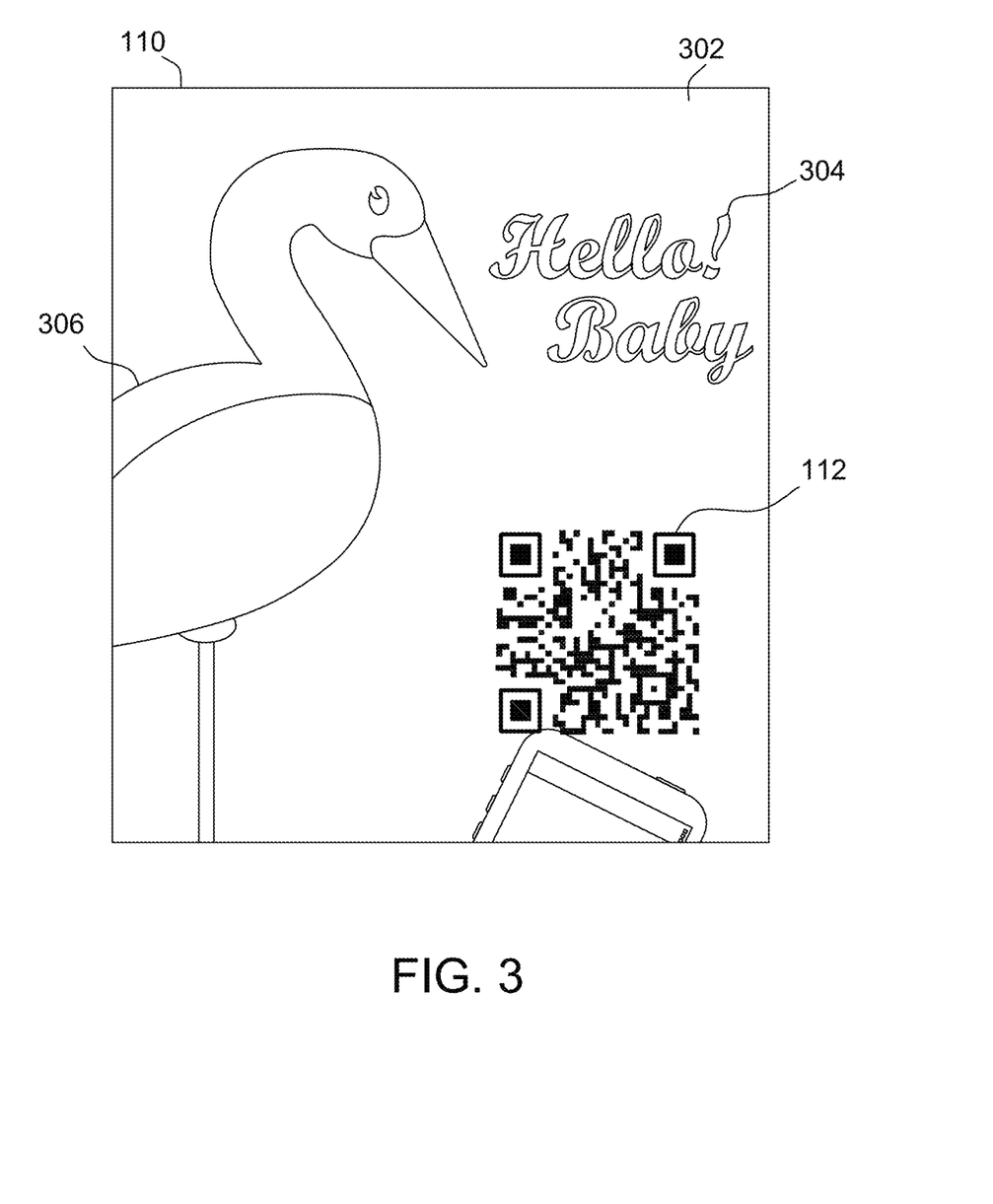
FIG. 3 is an example greeting card for use with the digital operation system shown in FIG. 1.

FIG. 3 is an exemplary embodiment of the DO greeting card 110 for use with the DO system 100, shown in FIGS. 1 and 2. The DO greeting card 110 is a physical greeting card formed of a material 302, e.g., paper, parchment, fabric, and the like. The DO greeting card 110 may include text 304, e.g., associated with a message to be displayed to a beneficiary 106. The DO greeting card 110 may also include decorations 306, e.g., images, pictures, decorative motifs, drawings, glitter, window boxes, ribbon, folded or pop-out features, and the like.

The DO greeting card 110 further includes the QR code 112. The QR code 112 may be similar in size as one or more of the decorations 306 displayed on the DO greeting card 110. The QR code 112 may be positioned generally in the center of the DO greeting card 110. The QR code 112 may be displayed on the same side of the DO greeting card 110 that also displays the text 304. The QR code 112 may be displayed on the same side of the DO greeting card 110 that also displays the decorations 306. In some embodiments, the DO greeting card 110 may include one or more user explanation messages, explaining to user how to use the DO greeting card 110 and/or DO profile 108. The user explanation message may be printed on an opposing side of the DO greeting card 110 as the QR code 112. In some embodiments, user text may be displayed near the QR code 112, e.g., displaying a message such as "Scan Me," or "Scan Here," or "Take a Picture of this Code," and the like, prompting users to scan the QR code 112. In some embodiments, messages may include a message directed to the benefactor, e.g., "Please scan the QR code to access messages from your friends and family." The QR code 112 may be a sufficient size and position to indicate to a user that scanning the QR will enable the user to access additional details that are not included on the physical greeting card 110. In alternative embodiments, the QR code 112 may be printed on an envelope.

Figure 4:
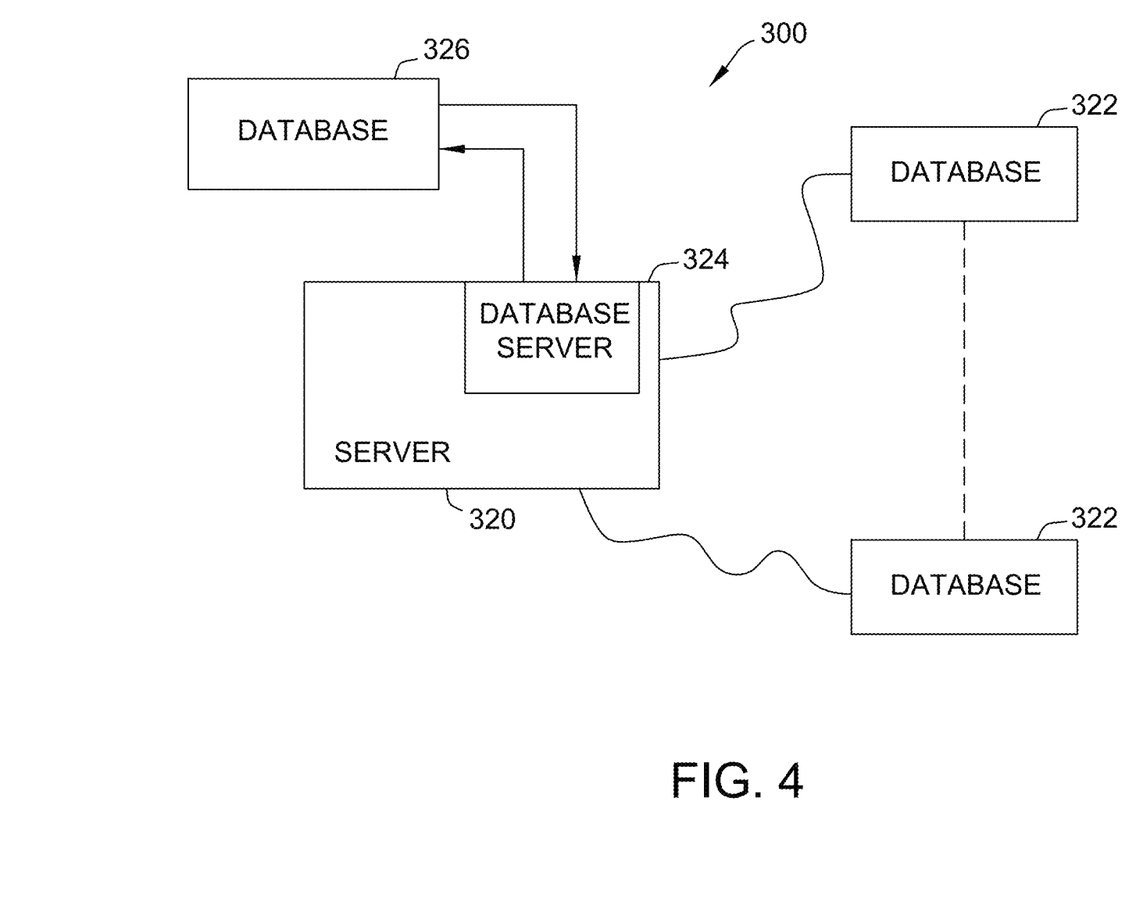
FIG. 4 is a simplified block diagram of an example computer system representative of a digital operation computer system for use with the digital operation system shown in FIG. 1.

FIG. 4 is a simplified block diagram of an example computer system 300 representative of a DO computer system 130 and one or more participant computer devices, e.g., participant computer devices 134 (shown in FIG. 1). In the example embodiment, system 300 includes a server system 320 and a plurality of client subsystems, also referred to as client systems 322, connected to server system 320. In one embodiment, client systems 322 are computers including a web browser, such that server system 320 is accessible to client systems 322 using the Internet. Client systems 322 are interconnected to the Internet through many interfaces including a network, such as a local area network (LAN) and/or a wide area network (WAN), dial-in connections, cable modems, wireless-connections, and special high-speed ISDN lines. Client systems 322 may be any device capable of interconnecting to the Internet including a web-based phone, personal digital assistant (PDA), or other web-connectable equipment. A database server 324 is connected to a database 326 containing information on a variety of matters, as described below in greater detail. In one embodiment, database 326 is stored on server system 320 and may be accessed by potential users at one of client systems 322 by logging onto server system 320 through one of client systems 322. In any alternative embodiment, database 326 is stored remotely from server system 320 and may be non-centralized.

As discussed below, payment card information including account numbers, payment card numbers, expiration dates, and account statuses, such as whether the account is open or closed, is stored within database 326. Further, data relating to the cardholder of a payment card may also be stored within database 326. Such cardholder data may include, for example, cardholder name and cardholder billing address.

Figure 5:
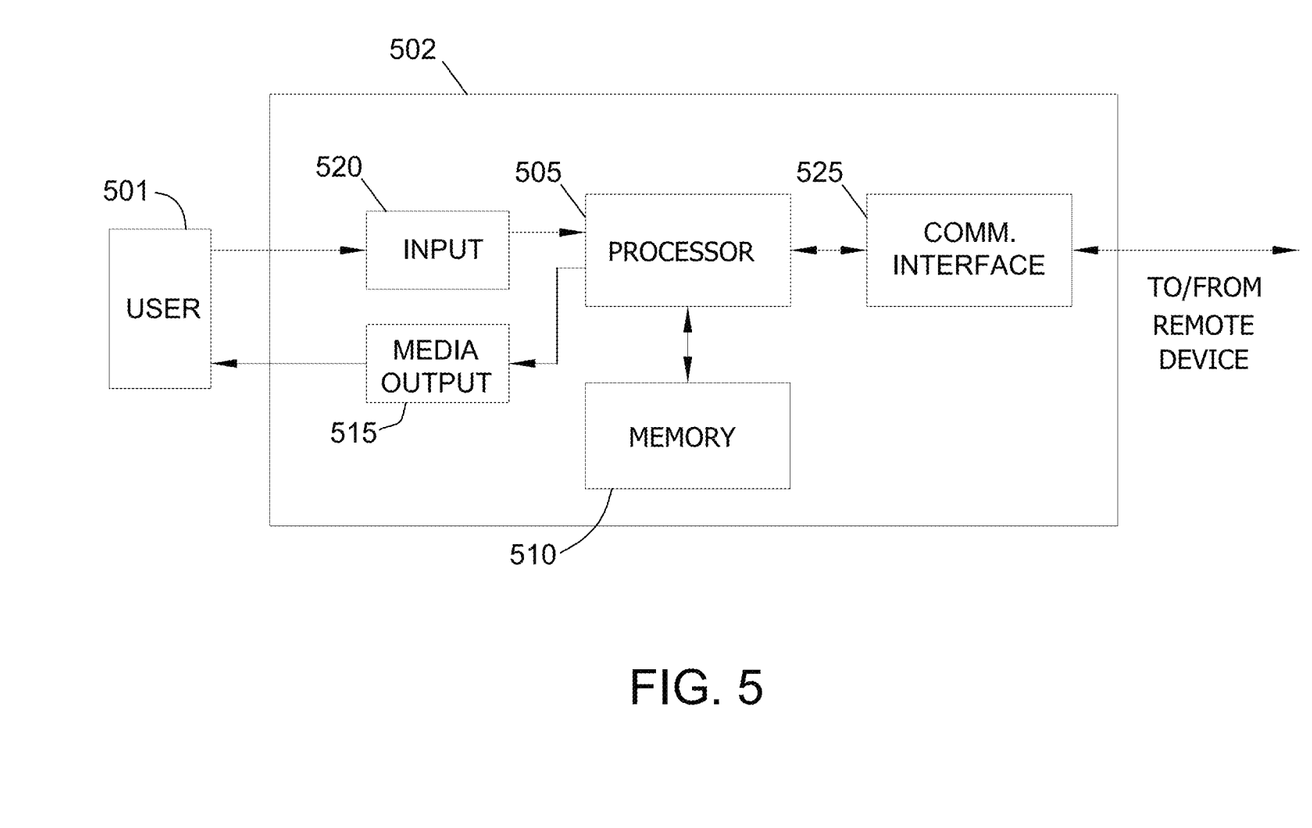
FIG. 5 illustrates an example configuration of a user computer system for use with the digital operation system shown in FIG. 1.

FIG. 5 illustrates an example configuration of a participant computer device 502 operated by any of participants 102. Participant computer device 502 may include, but is not limited to, participant computer devices 134 (shown in FIG. 1).

Participant computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or other data to be stored and retrieved. Memory area 510 may include one or more computer readable media.

Participant computer device 502 also includes at least one media output component 515 for presenting information to cardholder 501. Media output component 515 is any component capable of conveying information to cardholder 501. In some embodiments, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, participant computer device 502 includes an input device 520 for receiving input from cardholder 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Participant computer device 502 may also include a communication interface 525, which is communicatively couplable to a remote device such as server system 320 or a web server operated by a merchant. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer readable instructions for providing a user interface to cardholder 501 via media output component 515 and, optionally, receiving and processing input from input device 520. A user interface may include, among other possibilities, a web browser and client application. Web browsers enable cardholders, such as cardholder 501, to display and interact with media and other information typically embedded on a web page or a website from server system 320 or a web server associated with a merchant. A client application allows cardholder 501 to interact with a server application from server system 320 or a web server associated with a merchant.

Figure 6:
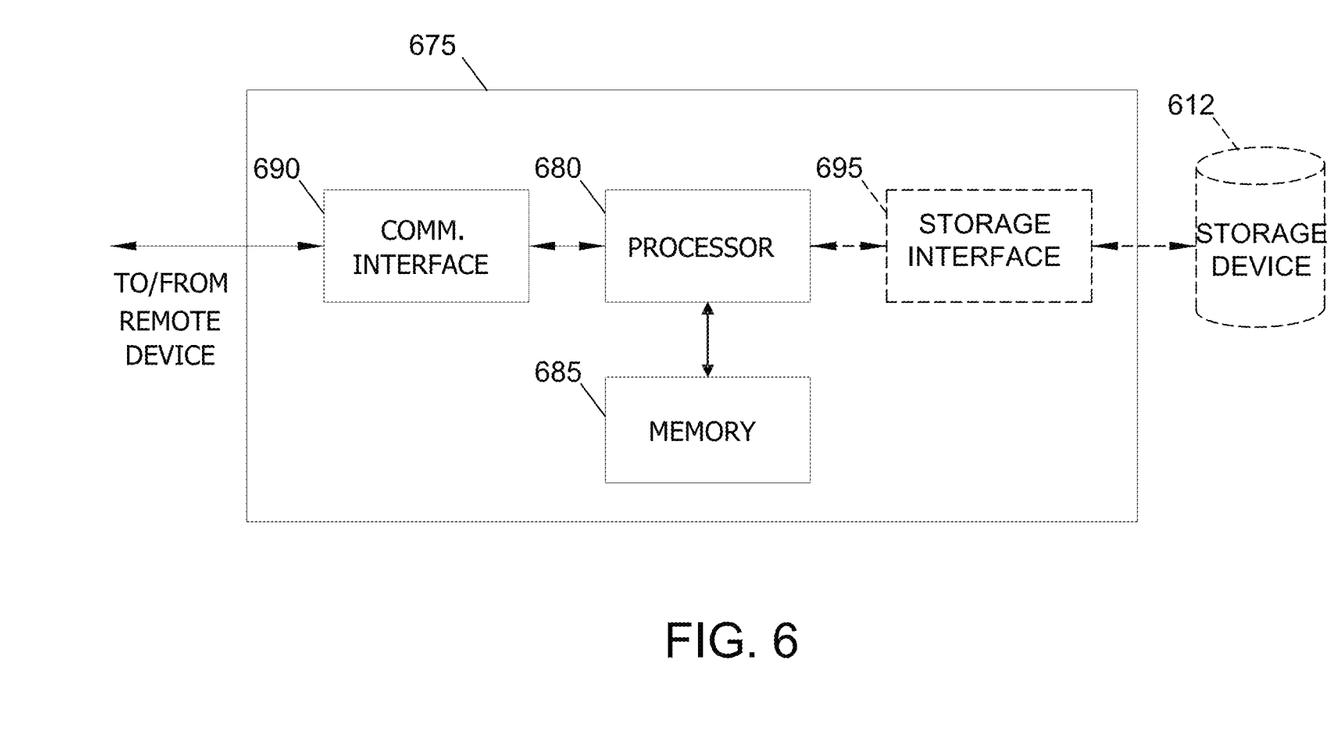
FIG. 6 illustrates an example configuration of a DO computer device for use with the digital operation system shown in FIG. 1.

FIG. 6 illustrates an example configuration of a server computer device 675 such as DO computer system 130 (shown in FIG. 1). Server computer device 675 may include, but is not limited to, the DO computer system 130 (shown in FIG. 1).

Server computer device 675 includes a processor 680 for executing instructions. Instructions may be stored in a memory area 685, for example. Processor 680 may include one or more processing units (e.g., in a multi-core configuration).

Processor 680 is operatively coupled to a communication interface 690 such that server computer device 675 is capable of communicating with a remote device such as participant computer device 502 (shown in FIG. 6) or another server computer device 675. For example, communication interface 690 may receive requests from client systems 322 via the Internet.

Processor 680 may also be operatively coupled to a storage device 612. Storage device 612 is any computer-operated hardware suitable for storing and/or retrieving data. In some embodiments, storage device 612 is integrated in server computer device 675. For example, server computer device 675 may include one or more hard disk drives as storage device 612. In other embodiments, storage device 612 is external to server computer device 675 and may be accessed by a plurality of server computer devices 675. For example, storage device 612 may include multiple storage units such as hard disks or solid-state disks in a redundant array of inexpensive disks (RAID) configuration. Storage device 612 may include a storage area network (SAN) and/or a network attached storage (NAS) system.

In some embodiments, processor 680 is operatively coupled to storage device 612 via a storage interface 695. Storage interface 695 is any component capable of providing processor 680 with access to storage device 612. Storage interface 695 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 680 with access to storage device 612.

Memory area 685 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only and are thus not limiting as to the types of memory usable for storage of a computer program.

Figure 7:
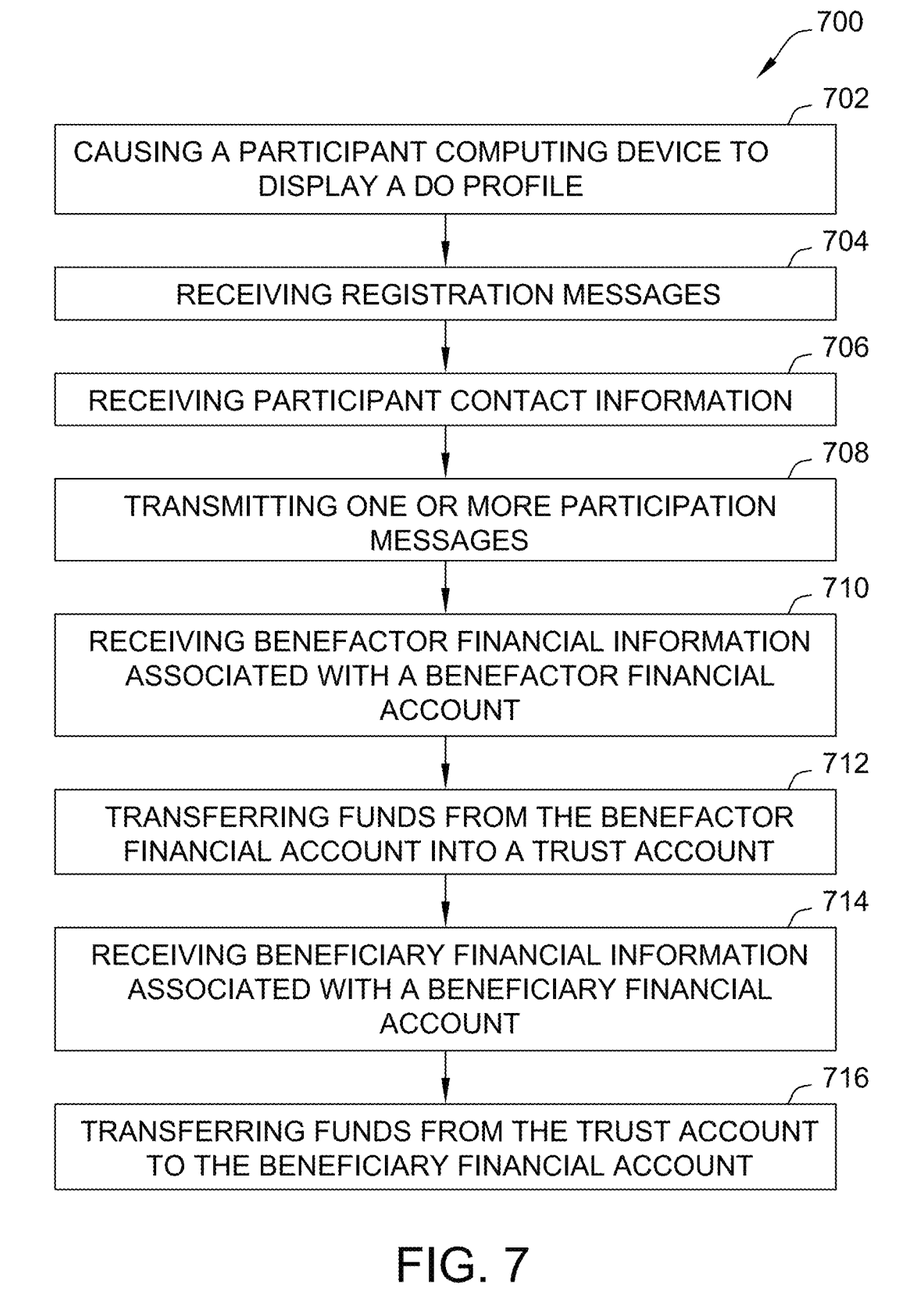
FIG. 7 is a flow diagram of an example method of implementing the digital operation system, which may be implemented by the computer system shown in FIG. 6.

FIG. 7 is a flow diagram of an example method 700 of implementing the DO system 100, as shown in FIGS. 1 and 2. Method 700 may be implemented by a computer system, e.g., DO computer system 130 and/or participant computer devices 134.

In some embodiments, the method 700 may include manufacturing the physical DO greeting card 110. Manufacturing may include printing the QR code 112 on a surface of the physical greeting card 110. In some embodiments, method 700 includes the DO computer system 130 pairing the QR code 112 to an available or unregistered DO profile 108.

In some embodiments, the method 700 includes the DO computer system 130 transmitting one or more instruction messages to the participant computer devices 134, causing 702 the participant computer devices 134 to display a DO profile 108, e.g., a registration view, the benefactor module 208, and/or the beneficiary module 212. The DO computer system 130 may transmit the instruction message in response to the participant computer devices 134 scanning the QR code 112.

The method 700 includes receiving 704, at the DO computer system 130, one or more registration messages containing registration data. The registration messages may be submitted from a participant computer device 134 associated with an organizer 120, e.g., after the participant computer device 134 has scanned the QR code 112. Upon receiving the registration message, the method 700 includes the DO computer system 130, automatically establishing the DO profile 108 to be associated with the scanned QR code 112. Registration messages may be submitted by the participant computer device 134 utilizing the DO profile 108.

The method 700 may further include receiving 706, at the DO computer system 130, benefactor 104 contact information and/or beneficiary 106 contact information, e.g., contained within a message or a participant submitted data file containing message data as well as configuration data. Contact information may be transmitted from the participant computer device 134, utilizing the DO profile 108. Upon receiving benefactor 104 and/or beneficiary 106 contact information, the method 700 includes the DO computer system 130 transmitting 708 one or more participation messages to the benefactors 104, prompting the benefactors 104 to interact with the registered DO profile 108. The participation messages may include a link, or a QR code, providing access to the DO profile 108 or benefactor module 208. The participation messages may include login credentials, enabling the participants 102 to access the DO profile 108. The method 700 may include the DO computer system 130 enabling access to the DO profile 108 by comparing metadata, cellphone data, and/or email data to data of authorized participants 102, e.g., participants 102 identified by the organizer 120 or identified during enrollment. The method 700 may include the DO computer system 130 restricting access to the DO profile 108 to users, e.g., cellphone numbers, which were not identified by the organizer 120 or identified during enrollment.

The method 700 may further include receiving at the DO computer system 130 a benefactor message, such as a participant submitted data file, from a participant computer device 134. The benefactor message may include text, video, audio, and/or any other suitable media file to be displayed to the beneficiary 106, e.g., via the DO profile 108 and/or the benefactor module 208.

The method 700 may further include receiving 710, at the DO computer system 130, benefactor 104 financial information associated with a benefactor financial account, submitted by any participant 102 using the DO profile 108. Upon receiving 710 benefactor 104 financial information, the method 700 further includes the DO computer system 130 establishing a financial link between the DO financial institution 140 and the participant financial institution 142 associated with the benefactor 104. The DO computer system 130 may also receive a donation amount, contained with the benefactor message or in connection with the submitted financial account information, and the method 700 further includes the DO computer system 130 transferring 712 funds from the benefactor financial account at the participant financial institution 142 into the trust account at the DO financial institution 140.

In some embodiments, the method 700 may further include the DO computer system 130 receiving, from a requesting computer device (such as a computer device not yet validated, authenticated, or identified as being associated with an approved participant 102, e.g., a designated beneficiary 106), which is initiated by the requesting device scanning of the scannable code 112, the second message requesting access to the DO profile 108. The method 700 may further include the DO computer system 130 transmitting one or more validating messages, requesting login credentials, a PIN, or any suitable validation data for the DO computer system 130 to authenticate if the requesting computer device is associated with an approved participant 102. In some embodiments, the method 700 includes automatically validating the requesting computing device by the computing device 108 comparing meta data to the approved participant data 102.

The method 700 may further include receiving 714, at the DO computer system 130, beneficiary 106 financial information associated with a beneficiary financial account, submitted by the beneficiary 106 using the DO profile 108 or the beneficiary module 212. Upon receiving beneficiary 106 financial information, the method 700 further includes the DO computer system 130 establishing a financial link between the DO financial institution 140 and the participant financial institution 142 associated with the beneficiary 106. The method 700 further includes the DO computer system 130 transferring 716 funds from the trust account at the DO financial institution 140 to the beneficiary financial account at the financial institution 142 associated with the beneficiary 106. In some embodiments, the method 700 further includes the DO computer system 130 may encrypt financial account information, e.g., benefactor or beneficiary, and the DO computer system 130 may delete financial account information after an expiration time.

In some embodiments, the method 700 further includes the DO computer system 130 translating participant submitted data files or messages into a common format.

In some embodiments, the method 700 further includes the DO computer system 130 receiving one or more response messages, e.g., thank you messages, from the beneficiary computer device 134. Upon receiving the response messages, method 700 further includes the DO computer system 130 transmitting one or more notification messages to participant computer devices 134, prompting a benefactor 104 to access the response messages. Response messages may include, for example and without limitation, text and/or media files, e.g., images and/or videos. For example, a response message may include images of a newborn for the occasion of a baby shower.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A digital operation (DO) system comprising:
  a greeting card;
  a scannable code positioned on a surface of the greeting card; and
  a computer device comprising at least one memory and at least one processor in communication with the memory, the at least one memory storing instructions executable to cause the at least one processor to:
    in response to a participant scanning the code on the greeting card, electronically create a profile data file stored within the at least one memory, the profile data file associated with the participant and a beneficiary designated by the participant, the profile data file configured to receive and store message data and configuration data, the configuration data including at least an account identifier for linking transferred funds to the profile data file;

electronically transmit a participating message to a benefactor computer device identified by the participant, the participating message prompting the benefactor to submit a participant data file including a benefactor account identifier and a contribution amount;

receive a first participant submitted data file from the benefactor computer device including the benefactor account identifier and the contribution amount for storing within the profile data file;

transfer funds equal to the contribution amount from the benefactor financial account into a trust account associated with the profile data file;

receive a second message from a requesting computer device initiated by scanning of the scannable code, the second message requesting access to the profile data file;

authenticate the requesting computer device as being associated with the designated beneficiary; and transfer the profile data file to the authenticated beneficiary computer device and funds in the contribution amount from the trust account into the beneficiary financial account.

2. The DO system of claim 1, wherein the at least one processor is further configured to:
translate the participant submitted data file, received from the participant computer device, having a first format into a common format.

3. The DO system of claim 1, wherein the at least one processor is further configured to:
encrypt configuration data contained within participant submitted data files.

4. The DO system of claim 1, wherein the participating message includes a selectable link configured to direct a participant computer device to the profile data file.

5. The DO system of claim 1, wherein upon a participant computer device scanning the code on the greeting card for a first time, the at least one processor is further configured to:
transmit one or more instruction messages to the participant computer device causing the participant computer device to display a registration view for registering a DO profile.

6. The DO system of claim 1, wherein the processor is further configured to:
reimburse funds in the trust account to the benefactor financial account upon expiration of a holding time.

7. The DO system of claim 1, wherein the processor is further configured to:
transmit a reminder message to at least one of a beneficiary computer device and a benefactor computer device, wherein the reminder message includes a prompt to interact with the profile data file.

8. A computer-implemented method of digital operation for use with a greeting card including a scannable code positioned on a surface of the greeting card and a computer system having a memory and at least one processor in communication with the memory, the method comprising:

in response to a participant scanning the code on the greeting card, electronically creating a profile data file stored within the at least one memory, the profile data file associated with the participant and a beneficiary designated by the participant, the profile data file configured to receive and store message data and configuration data, the configuration data including at least an account identifier for linking transferred funds to the profile data file;

electronically transmitting a participating message to a benefactor computer device identified by the participant, the participating message prompting the benefactor to submit a participant data file including a benefactor account identifier and a contribution amount;

receiving a first participant submitted data file from the benefactor computer device including the benefactor account identifier and the contribution amount for storing within the profile data file;

transferring funds equal to the contribution amount from the benefactor financial account into a trust account associated with the profile data file;

receiving a second message from a requesting computer device initiated by scanning of the scannable code, the second message requesting access to the profile data file;

authenticating the requesting computer device as being associated with the designated beneficiary; and transferring the profile data file to the authenticated beneficiary computer device and funds in the contribution amount from the trust account into the beneficiary financial account.

9. The computer-implemented method according to claim 8, wherein the at least one processor is further configured to:
translating the participant submitted data file, received from the participant computer device, having a first format into a common format.

10. The computer-implemented method according to claim 8, wherein the at least one processor is further configured to:
encrypt configuration data contained within participant submitted data files.

11. The computer-implemented method according to claim 8, wherein the participating message includes a selectable link configured to direct a participant computer device to the profile data file.

12. The computer-implemented method according to claim 8, wherein upon a participant computer device scanning the code on the greeting card for a first time, the at least one processor is further configured to:
transmitting one or more instruction messages to the participant computer device causing the participant computer device to display a registration view for registering a DO profile.

13. The computer-implemented method according to claim 8, wherein the processor is further configured to:
reimbursing funds in the trust account to the benefactor financial account upon expiration of a holding time.

14. At least one non-transitory computer-readable storage medium that includes computer-executable instructions embodied thereon that when the computer-executable instructions are executed by at least one processor of a digital operation computer, the computer-executable instructions cause the at least one processor to:

in response to a participant scanning a code on a greeting card, electronically create a profile data file stored within a memory, the profile data file associated with the participant and a beneficiary designated by the participant, the profile data file configured to receive and store message data and configuration data, the configuration data including at least an account identifier for linking transferred funds to the profile data file;

electronically transmit a participating message to a benefactor computer device identified by the participant, the participating message prompting the benefactor to submit a participant data file including a benefactor account identifier and a contribution amount;

receive a first participant submitted data file from the benefactor computer device including the benefactor account identifier and the contribution amount for storing within the profile data file;

transfer funds equal to the contribution amount from the benefactor financial account into a trust account associated with the profile data file;

receive a second message from a requesting computer device initiated by scanning of the scannable code, the second message requesting access to the profile data file;

authenticate the requesting computer device as being associated with the designated beneficiary; and transfer the profile data file to the authenticated beneficiary computer device and funds in the contribution amount from the trust account into the beneficiary financial account.

15. The non-transitory computer-readable storage medium according to claim 14, wherein the at least one processor is further configured to:

translate the participant submitted data file, received from the participant computer device, having a first format into a common format.

16. The non-transitory computer-readable storage medium according to claim 14, wherein the at least one processor is further configured to:

encrypt configuration data contained within participant submitted data files.

17. The non-transitory computer-readable storage medium according to claim 14, wherein the participating message includes a selectable link configured to direct a participant computer device to the profile data file.

18. The non-transitory computer-readable storage medium according to claim 14, wherein upon a participant computer device scanning the code on the greeting card for a first time, the at least one processor is further configured to:

transmit one or more instruction messages to the participant computer device causing the participant computer device to display a registration view for registering a DO profile.

19. The non-transitory computer-readable storage medium according to claim 14, wherein the processor is further configured to:

reimburse funds in the trust account to the benefactor financial account upon expiration of a holding time.

20. The non-transitory computer-readable storage medium according to claim 14, wherein the processor is further configured to:

transmit a reminder message to at least one of a beneficiary computer device and a benefactor computer device, wherein the reminder message includes a prompt to interact with the profile data file.

* * * * *